(12) United States Patent
Santini et al.

(10) Patent No.: US 11,314,307 B2
(45) Date of Patent: Apr. 26, 2022

(54) SMART UNIVERSAL SERIAL BUS (USB-PD (POWER DELIVERY)) OUTLETS FOR USE IN AIRCRAFT AND SYSTEM AND PROCESS FOR IMPLEMENTING THE SAME

(71) Applicant: Data Device Corporation, Bohemia, NY (US)

(72) Inventors: John Santini, Bohemia, NY (US); Brett R. McKibbin, Bohemia, NY (US)

(73) Assignee: Data Device Corporation, Bohemia, NY (US)

( * ) Notice: Subject to any disclaimer, the term of this patent is extended or adjusted under 35 U.S.C. 154(b) by 0 days.

(21) Appl. No.: 17/032,072

(22) Filed: Sep. 25, 2020

(65) Prior Publication Data

US 2021/0097017 A1    Apr. 1, 2021

Related U.S. Application Data

(60) Provisional application No. 62/906,376, filed on Sep. 26, 2019.

(51) Int. Cl.
| | |
|---|---|
| *G06F 13/42* | (2006.01) |
| *G06F 1/3206* | (2019.01) |
| *G06F 1/3296* | (2019.01) |
| *G06F 1/26* | (2006.01) |

(52) U.S. Cl.
CPC .......... *G06F 1/3206* (2013.01); *G06F 1/266* (2013.01); *G06F 1/3296* (2013.01); *G06F 13/4282* (2013.01); *G06F 2213/0042* (2013.01)

(58) Field of Classification Search
CPC . G06F 1/188; G06F 1/189; G06F 1/26; G06F 1/263; G06F 1/266; G06F 1/28; G06F 1/32; G06F 1/3203; G06F 1/3206; G06F 1/3234; G06F 1/3296; G06F 13/4282; G06F 2213/0042
See application file for complete search history.

(56) References Cited

U.S. PATENT DOCUMENTS

| | | | |
|---|---|---|---|
| 9,914,548 B1* | 3/2018 | Vadillo | H02J 7/0027 |
| 2014/0325245 A1* | 10/2014 | Santini | G06F 1/266 |
| | | | 713/300 |
| 2018/0120910 A1* | 5/2018 | Farkas | G06F 1/266 |
| 2018/0232021 A1* | 8/2018 | Perchlik | G06F 1/206 |
| 2018/0284866 A1* | 10/2018 | Sakai | G06F 1/325 |
| 2018/0323626 A1* | 11/2018 | Suen | H02J 7/0044 |
| 2019/0238705 A1* | 8/2019 | Shimamura | G06F 1/28 |
| 2020/0091758 A1* | 3/2020 | Jahan | H02J 7/00 |
| 2020/0094968 A1* | 3/2020 | Sloboda | G06F 13/40 |
| 2021/0135790 A1* | 5/2021 | Files | H04L 1/189 |

* cited by examiner

*Primary Examiner* — Thomas J. Cleary
(74) *Attorney, Agent, or Firm* — BakerHostetler (57) ABSTRACT

An aircraft-based power system includes at least one smart universal serial bus (USB-PD (Power Delivery)) outlet. The at least one smart universal serial bus (USB-PD (Power Delivery)) outlet being configured to connect to a power bus that receives power from a power source system. The at least one smart universal serial bus (USB-PD (Power Delivery)) outlet is further configured to control power delivery.

20 Claims, 7 Drawing Sheets

SMART UNIVERSAL SERIAL BUS (USB-PD (POWER DELIVERY)) OUTLETS FOR USE IN AIRCRAFT AND SYSTEM AND PROCESS FOR IMPLEMENTING THE SAME

CROSS-REFERENCE TO RELATED APPLICATIONS

This application claims the benefit of U.S. Provisional Application No. 62/906,376 filed on Sep. 26, 2019, which is hereby incorporated by reference in its entirety for all purposes as if fully set forth herein.

FIELD OF THE DISCLOSURE

The disclosure relates to smart universal serial bus (USB-PD (Power Delivery)) outlets for use in aircraft, other means of transport, and/or facilities. Additionally, the disclosure relates to a process for implementing smart universal serial bus (USB-PD (Power Delivery)) outlets for use in aircraft, other means of transport, and/or facilities. The disclosure further relates to a system implementing smart universal serial bus (USB-PD (Power Delivery)) outlets for use in aircraft, other means of transport, and/or facilities. Additionally, the disclosure relates to a process for implementing the system implementing smart universal serial bus (USB-PD (Power Delivery)) outlets for use in aircraft, other means of transport, and/or facilities.

BACKGROUND OF THE DISCLOSURE

Aircraft, other means of transport, and/or facilities typically benefit from one or more systems to provide power for passengers, crew, individuals, and/or the like to power to their devices. For example, providing USB power outlets to provide power to their devices. However, with USB power demands increasing to 40 watts, 60 watts, and more for each device, very often the limited power available is not enough to supply the maximum power requested by a plurality of the devices. Prior art systems are typically configured to deny access to any more user devices once a predetermined safe power level is reached. Accordingly, this prevents some user devices from getting any power at all.

Accordingly, what is needed is a system implemented in various means of transport or facilities to improve power delivery to devices for passengers, crew, individuals, and/or the like.

SUMMARY OF THE DISCLOSURE

The foregoing needs are met, to a great extent, by the disclosure, wherein smart universal serial bus (USB-PD (Power Delivery)) outlets for use in aircraft, other means of transport, and/or facilities and a process for implementing smart universal serial bus (USB-PD (Power Delivery)) outlets for use in aircraft, other means of transport, and/or facilities are provided. Additionally, the foregoing needs are met, to a great extent, by the disclosure, wherein a system implementing smart universal serial bus (USB-PD (Power Delivery)) outlets for use in aircraft, other means of transport, and/or facilities and a process for implementing a system having smart universal serial bus (USB-PD (Power Delivery)) outlets for use in aircraft, other means of transport, and/or facilities are provided.

One general aspect includes an aircraft-based power system including at least one smart universal serial bus (USB-PD (Power Delivery)) outlet, the at least one smart universal serial bus (USB-PD (Power Delivery)) outlet being configured to connect to a power bus that receives power from a power source system, the power source system configured to generate an output characteristic indicating a total system power loading, and the at least one smart universal serial bus (USB-PD (Power Delivery)) outlet is further configured to sense the output characteristic, calculate a present capacity available from the power bus, and control power delivery.

One general aspect includes an aircraft-based power system including at least one smart universal serial bus (USB-PD (Power Delivery)) outlet, the at least one smart universal serial bus (USB-PD (Power Delivery)) outlet being configured to connect to a power bus that receives power from a power source system, the at least one smart universal serial bus (USB-PD (Power Delivery)) outlet is further configured to receive an indication of total power draw through a DC share bus, and the at least one smart universal serial bus (USB-PD (Power Delivery)) outlet is further configured to receive the indication, calculate a present capacity available from the power bus, and control power delivery.

One general aspect includes an aircraft-based power system including at least one smart universal serial bus (USB-PD (Power Delivery)) outlet, the at least one smart universal serial bus (USB-PD (Power Delivery)) outlet being configured to connect to a power bus that receives power from a power source system, the at least one smart universal serial bus (USB-PD (Power Delivery)) outlet further configured to digitize a power used and communicate the power used to a central hub, where the central hub is configured to monitor power levels and command power reduction via USB renegotiation when a total power limit is reached, and the at least one smart universal serial bus (USB-PD (Power Delivery)) outlet configured to receive the command and control power delivery.

One general aspect includes a power system including at least one smart universal serial bus (USB-PD (Power Delivery)) outlet, the at least one smart universal serial bus (USB-PD (Power Delivery)) outlet being configured to connect to a power bus that receives power from a power source system, the power source system configured to generate an output characteristic indicating a total system power loading, and the at least one smart universal serial bus (USB-PD (Power Delivery)) outlet is further configured to sense the output characteristic, calculate a present capacity available from the power bus, and control power delivery.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

The disclosure will now be described with reference to the drawing Figures, in which like reference numerals refer to like parts throughout. Aspects of the disclosure advantageously provide smart universal serial bus (USB-PD (Power Delivery)) outlets for use in aircraft, other means of transport, and/or facilities. Additionally, the disclosure relates to a process for implementing smart universal serial bus (USB-PD (Power Delivery)) outlets for use in aircraft, other means of transport, and/or facilities.

Figure 1:
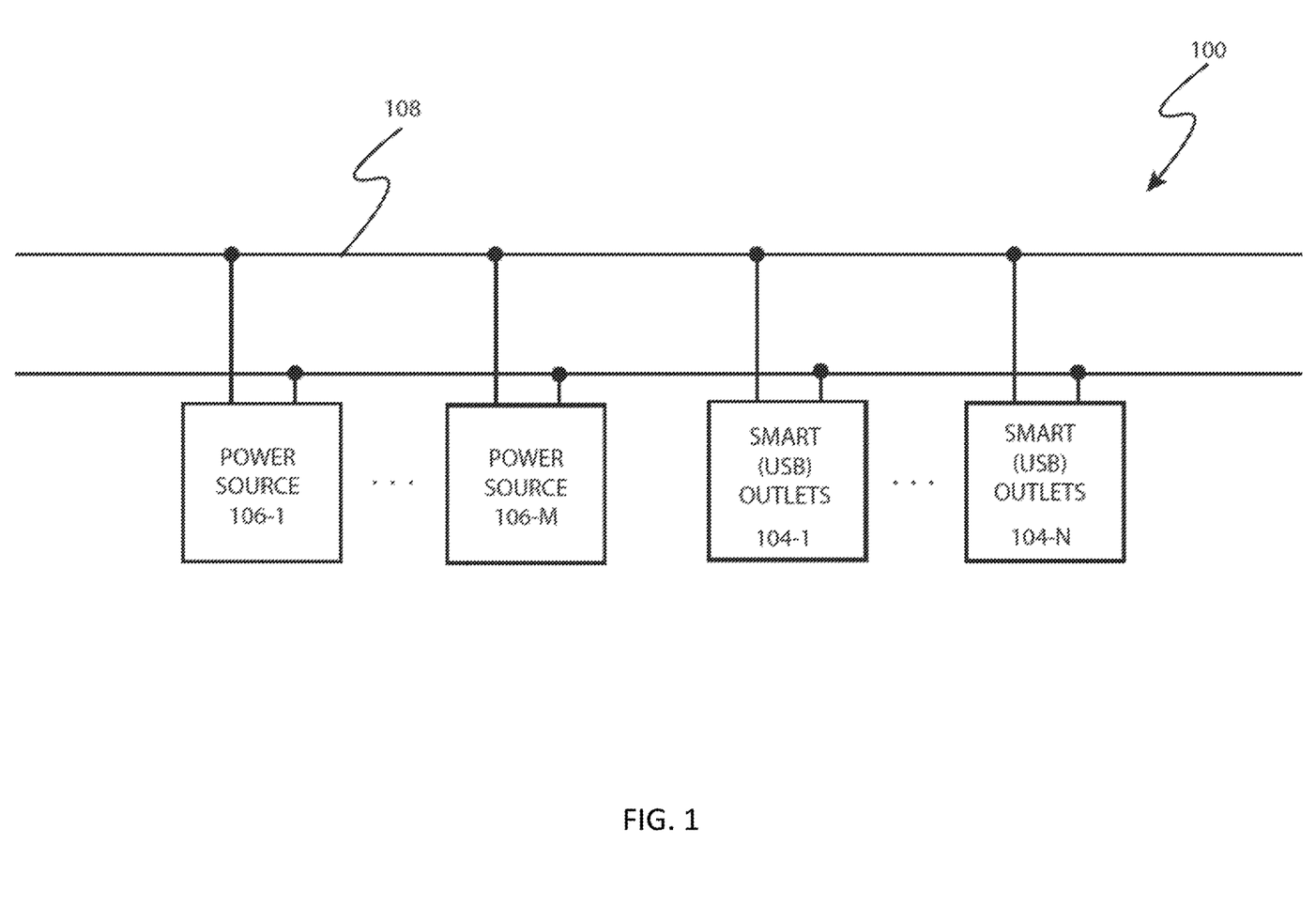
FIG. 1 illustrates an exemplary electrical power system for aircraft, other means of transport, and/or facilities in accordance with aspects of the disclosure.

FIG. 1 illustrates an exemplary electrical power system for an aircraft, other means of transport, and/or facilities in accordance with aspects of the disclosure.

FIG. 1 illustrates an exemplary power system. For simplicity and brevity of disclosure, the exemplary power system is illustrated with a high level of simplification. Moreover, although reference is made to an implementation in aircraft or other aerospace applications, the disclosure is equally applicable to implementations in other types of vehicles and facilities, as well as other systems benefiting from supplying power to devices for crew, passengers, individuals, and/or the like. For example, systems implemented in trains, buses, convention halls, and/or the like providing power to devices for crew, passengers, individuals, and/or the like. For simplicity and brevity of disclosure, the exemplary power system is further described herein as an aircraft power system 100.

In particular, FIG. 1 illustrates an aircraft power system 100. The aircraft power system 100 may include an aircraft power bus 108. The aircraft power bus 108 may include at least two power lines providing positive and negative voltage potential. The aircraft power bus 108 may extend along at least a portion of the aircraft internally connecting to various aircraft systems. For example, the aircraft power bus 108 may connect to smart universal serial bus (USB-PD (Power Delivery)) outlets 104-1 through smart universal serial bus (USB-PD (Power Delivery)) outlets 104-N, where N is a positive integer. As a more specific example, the aircraft power bus 108 may extend along a length of an aircraft cabin and may connect to the smart universal serial bus (USB-PD (Power Delivery)) outlets 104 that may be arranged in and/or adjacent aircraft seats for passengers to connect their devices to for receiving power during a flight.

The aircraft power system 100 may further include at least one power source system 106 (power source system 106-1 through power source system 106-M, wherein M is a positive integer). The power source system 106 may receive power from a generator associated with the aircraft. For example, a generator associated with an auxiliary power unit, a generator associated with an aircraft engine, such as a turbo fan, turbine, and/or the like. Additionally, the power source system 106 may receive power from an external source such as ground equipment, facility equipment, airport gate supply sources, and/or the like. When operational, the power source system 106 provides power to the aircraft power bus 108 for operation of the smart universal serial bus (USB-PD (Power Delivery)) outlets 104.

In this regard, the disclosure involves the use of the smart universal serial bus (USB-PD (Power Delivery)) outlets 104 for use in aircraft and other implementations where power is limited. Since the power available in an aircraft is limited, the disclosed implementation of the smart universal serial bus (USB-PD (Power Delivery)) outlets 104 ensures and/or guarantees that the aircraft power system is never overloaded.

The disclosed system may include a number of the smart universal serial bus (USB-PD (Power Delivery)) outlets 104, all connected in parallel on a DC power bus (the aircraft power bus 108), and a DC power supply (the power source system 106) for the aircraft power bus 108. In one aspect, the DC power supply may be configured to generate and have an output characteristic that mimics an artificial output impedance of a known value. For instance, the output voltage might drop 100 milli-volts (mV) for every amp of output current, such that an output load of 10 amps (A) would produce a 1 volt (V) drop in output voltage. Thus, by monitoring a bus voltage at the smart universal serial bus (USB-PD (Power Delivery)) outlets 104, the total system power loading can be determined. Alternatively, other signals and other signal over power protocols may be implemented to allow the smart universal serial bus (USB-PD (Power Delivery)) outlets 104 to receive a determination of the total system power loading.

Standard USB protocol defines communications between the user device and the USB supply which includes a "negotiation" for power required. Thus, if a user plugs in a fully charged cellphone, the cellphone may only request 5 volts (V) at a maximum current of 1 amp (A), and the USB jack would supply 5 V at a current of up to 1 A. However, if a user were to plug in a laptop with a partially charged battery, the laptop might be able to accept 20 V at up to 3 A. A normal USB negotiation would provide 20 V at 3 A if the adapter was rated for this, or it might only provide 5 V at 3 A, for example, if that's what the adapter was capable of. As a result, the laptop might operate, but not charge its battery.

The smart universal serial bus (USB-PD (Power Delivery)) outlets 104 are configured to sense the input bus voltage, and calculate the present capacity available on the DC bus. Accordingly, if the DC bus were only 50% loaded, the smart universal serial bus (USB-PD (Power Delivery)) outlets 104 would know the loading as described above, and offer as much power as the smart universal serial bus (USB-PD (Power Delivery)) outlets 104 are rated for (for instance, 20 V and 3 A, or 60 watts (W)). Additionally, the smart universal serial bus (USB-PD (Power Delivery)) outlets 104 will continue monitoring the bus voltage and determining the total system power loading. In this regard, as the total bus power approaches 100%, the smart universal serial bus (USB-PD (Power Delivery)) outlets 104 may begin to re-negotiate the delivered power to a lower level in order to limit the total system power consumption.

In this regard, the precise level at which this negotiation is started may be randomized, to some extent, such that the net effect would be to reduce the existing power draw as the system limit is approached. Since the smart universal serial bus (USB-PD (Power Delivery)) outlets 104 may not communicate with each other directly, as the total bus power reaches higher levels, eventually all of the smart universal serial bus (USB-PD (Power Delivery)) outlets 104 would begin to negotiate lower power levels.

As the smart universal serial bus (USB-PD (Power Delivery)) outlets 104 begin cutting back their power output, the overall system power draw is reduced, until it is at a predetermined level below the maximum. At that point, the smart universal serial bus (USB-PD (Power Delivery)) outlets 104 could randomly increase power again if the connected device could use the extra power. The result would be that if the system were overloaded by too many high-power loads, all the loads would see random periodic reductions in order to maintain the maximum power below the rated limit.

The effect is to limit the total DC bus power to a safe level while having a minimal impact on the users. Typically, the users' devices would be limited in their ability to recharge their internal battery, while basic operation would continue without interruption. The negotiation would not require specific load information, the smart universal serial bus (USB-PD (Power Delivery)) outlets 104 would simply attempt to negotiate lower power step by step (systematically reducing voltage and current) until the device (the load) accepted a lower level.

Additional power limiting features could also be implemented on the DC power supplies (the power source system 106). For instance, if the power supply temperature reaches a predetermined level, this could trigger a reduction in the power draw by negotiating the USB power draw lower, thus reducing power dissipation. USB Power negotiation could also be initiated if an AC input voltage dropped below limits, as an additional protection feature.

Figure 2:
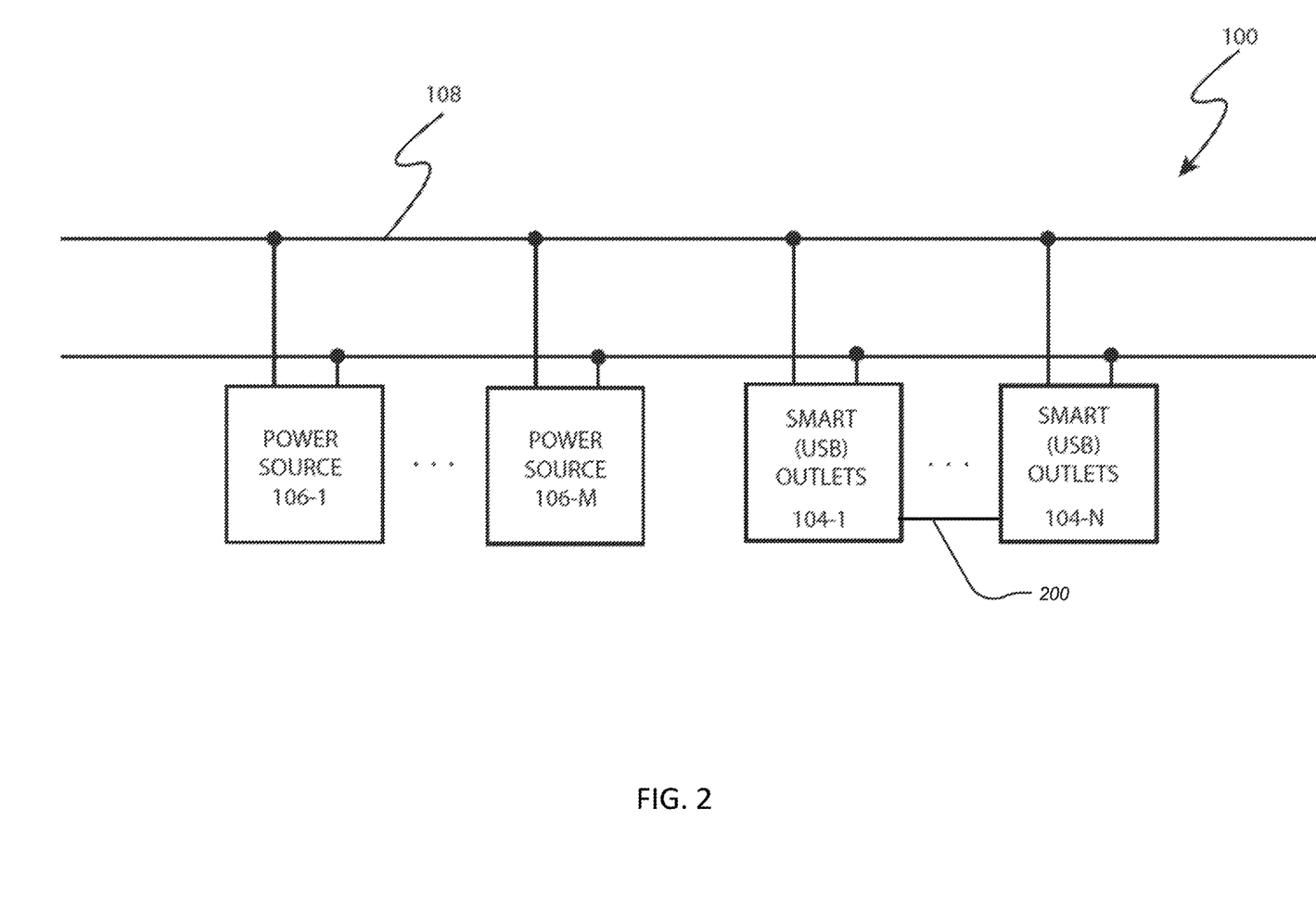
FIG. 2 illustrates an exemplary electrical power system for aircraft, other means of transport, and/or facilities in accordance with aspects of the disclosure.

FIG. 2 illustrates an exemplary electrical power system for aircraft, other means of transport, and/or facilities in accordance with aspects of the disclosure.

With reference to FIG. 2, the disclosure may not be tied to a particular way to indicate bus loading, nor to a particular number of the smart universal serial bus (USB-PD (Power Delivery)) outlets 104 on the power bus. Another analog method to indicate total power draw would be to use a DC "share" bus 200. For example, this implementation and method may use a single wire connected to all the smart universal serial bus (USB-PD (Power Delivery)) outlets 104, in daisy-chain fashion, with a load resistor at one end. Each USB power converter sources a proportionate current into the share bus based on the power it is drawing. As an example, a USB converter, which was supplying 10 watts of USB power would source 1 milli-amp (mA) of current into the share bus. Another USB converter supplying 60 W of power would source 6 mA of current into the share bus. The resultant 7 mA of total current would produce a voltage of 7 mV on the share bus (assuming a load resistor of 1 ohm was used), which would be monitored by all the USB converters on the bus. Thus, each converter on the bus would know that the total power bus loading was 70 watts and would respond appropriately. However, it is contemplated that the DC "share" bus 200 may utilize other signaling protocols, signals, and/or the like.

Figure 3:
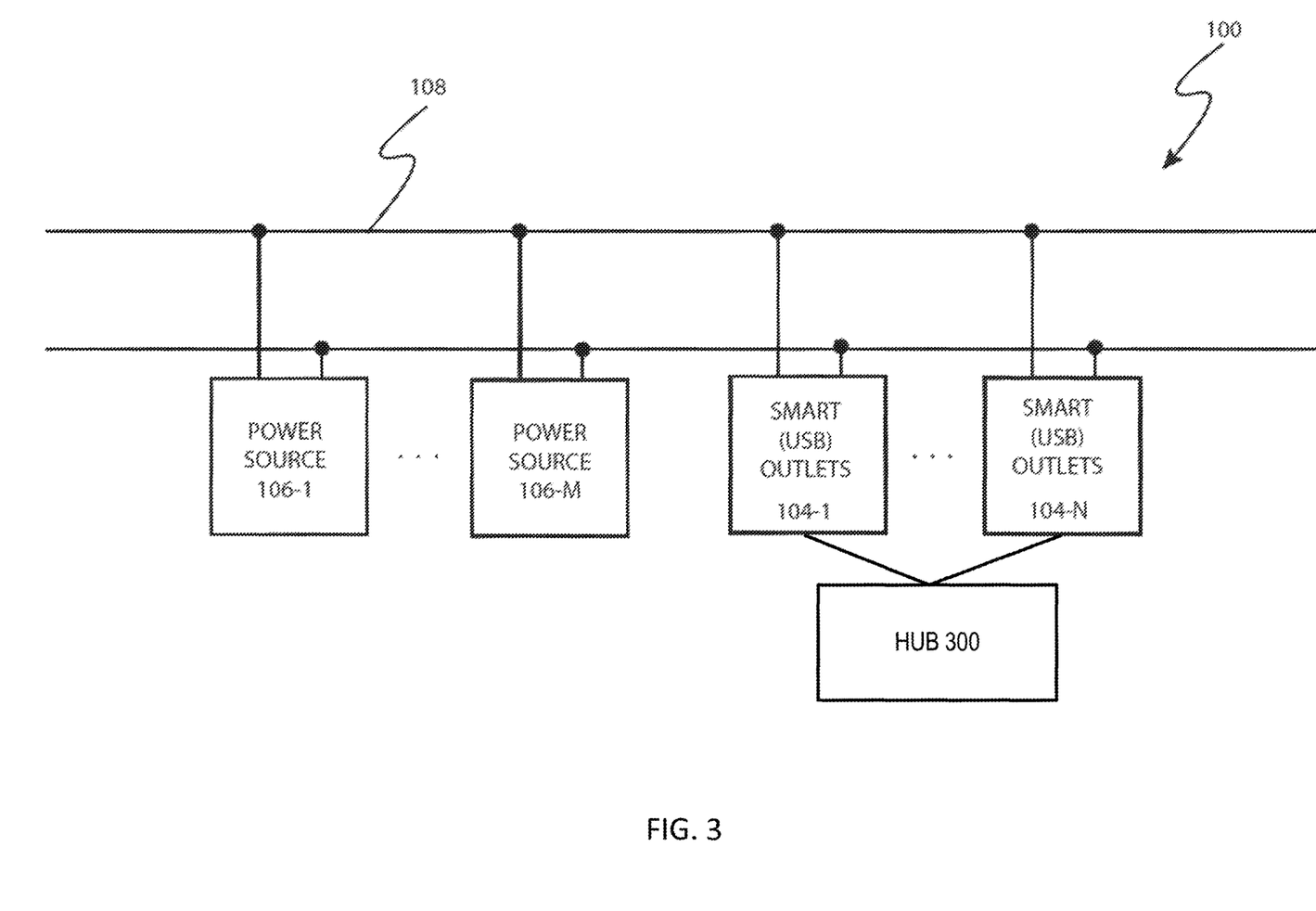
FIG. 3 illustrates an exemplary electrical power system for aircraft, other means of transport, and/or facilities in accordance with aspects of the disclosure.

FIG. 3 illustrates an exemplary electrical power system for aircraft, other means of transport, and/or facilities in accordance with aspects of the disclosure.

With reference to FIG. 3, yet another way to monitor total bus loading would be to digitize the power used by the USB converter. The digitized power level would be communicated to a central hub 300, which would monitor the levels and command power reduction via USB renegotiation by the smart universal serial bus (USB-PD (Power Delivery)) outlets 104 when a total power limit was reached.

Figure 4:
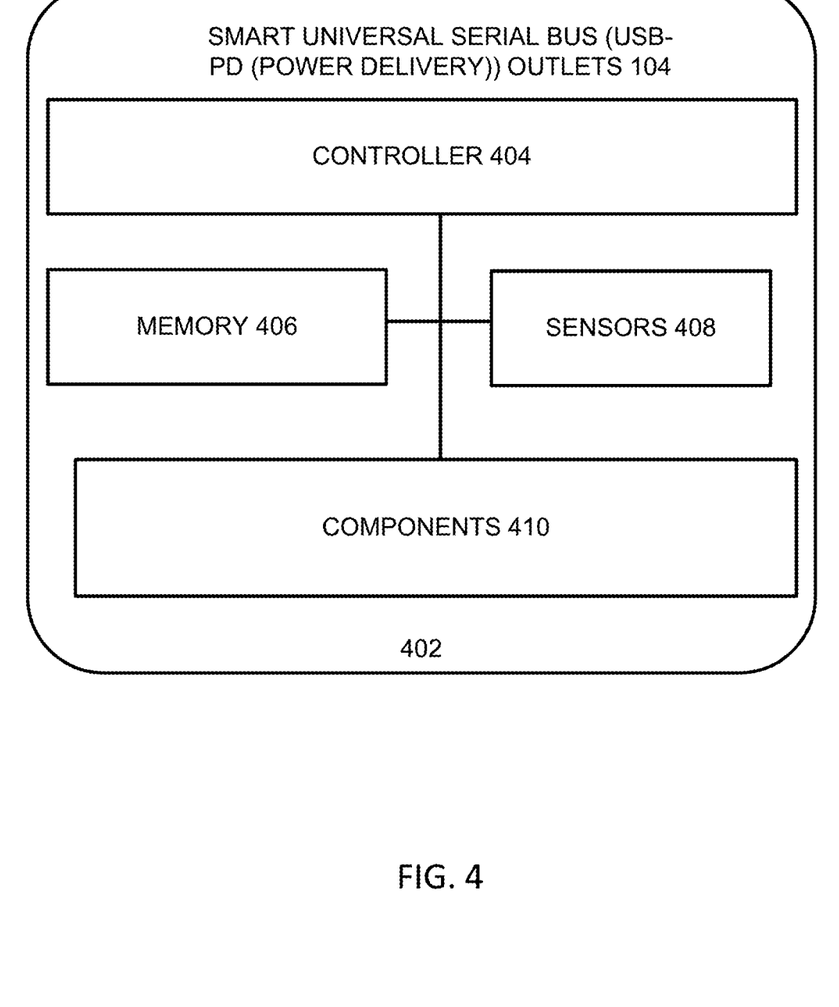
FIG. 4 illustrates an exemplary configuration of a smart universal serial bus (USB-PD (Power Delivery)) outlet according to the disclosure.

FIG. 4 illustrates an exemplary configuration of a smart universal serial bus (USB-PD (Power Delivery)) outlet according to the disclosure.

With reference to FIG. 4, the smart universal serial bus (USB-PD (Power Delivery)) outlets 104 may include a housing assembly 402 and may include a front cover, and the housing assembly 402 may be implemented as a protective case for the smart universal serial bus (USB-PD (Power Delivery)) outlets 104. In one aspect, the housing assembly 402 may be hermetically sealed to prevent intrusion of foreign objects. In one aspect, the housing assembly 402 may be waterproof, watertight, and/or water resistant to prevent intrusion of water and other liquids present in the environment of the housing assembly 402 and the aircraft. In this regard, the housing assembly 402 may include one or more seals, gaskets, adhesives, waterproof coatings, potting materials, and/or the like.

The smart universal serial bus (USB-PD (Power Delivery)) outlets 104 may include a controller 404. The controller 404 may include a processor or other hardware that may include a memory 406, and the like. The processor of the controller 404 may be configured to process functions, provide other services, and the like as disclosed herein. The smart universal serial bus (USB-PD (Power Delivery)) outlets 104 may implement an operating system, a communications component, and the like to provide full functionality. In particular, the processor of the controller 404 may be configured to execute a software application configured to control the smart universal serial bus (USB-PD (Power Delivery)) outlets 104. In one aspect, the software application may be configured to interact with sensors, aircraft systems, and/or the like.

The smart universal serial bus (USB-PD (Power Delivery)) outlets 104 may further include one or more sensors 408 to sense a condition of the smart universal serial bus (USB-PD (Power Delivery)) outlets 104, the aircraft power bus 108, the DC "share" bus 200, an aircraft system, and/or the like. In particular, the one or more sensors 408 may provide signals to the processor of the controller 404. The one or more sensors 408 may include a current sensor, a voltage sensor, temperature sensor, and/or the like.

The smart universal serial bus (USB-PD (Power Delivery)) outlets 104 may include components 410. The components 410 may include USB connectors implementing one or more of a standard size format, mini size format, micro size format, and/or the like. The USB connectors implementing any one or more of a female configuration, male configuration, type A configuration, a type B configuration, and/or the like.

The components 410 may further include one or more of a DC to DC converter, a voltage regulator, fuses, a ground fault circuit interrupter, temperature sensing circuits, voltage sensing circuits, input devices, output devices, analog-to-digital converters, digital to analog converters, communication devices, and/or the like. The DC to DC converter converts a source of direct current (DC) from one voltage level to another as needed within the smart universal serial bus (USB-PD (Power Delivery)) outlets 104. The voltage regulator may be configured to provide a stable DC voltage independent of the load current, temperature, and the like as needed within the smart universal serial bus (USB-PD (Power Delivery)) outlets 104. The one or more fuses may be configured to protect against excessive current as needed within the smart universal serial bus (USB-PD (Power Delivery)) outlets 104. The ground fault circuit interrupter (GFCI) may be configured to break an electric circuit to prevent serious harm from an ongoing electric shock as needed within the smart universal serial bus (USB-PD (Power Delivery)) outlets 104.

The smart universal serial bus (USB-PD (Power Delivery)) outlets 104 may be configured to utilize outputs from the temperature or voltage sensing circuits monitored by the controller 404 to safely operate. The smart universal serial bus (USB-PD (Power Delivery)) outlets 104 may be configured to implement various safety protections. The safety protections implemented by the smart universal serial bus (USB-PD (Power Delivery)) outlets 104 may include over voltage protection, over current protections, over heat protections, short-circuit protections, and like.

Figure 5:
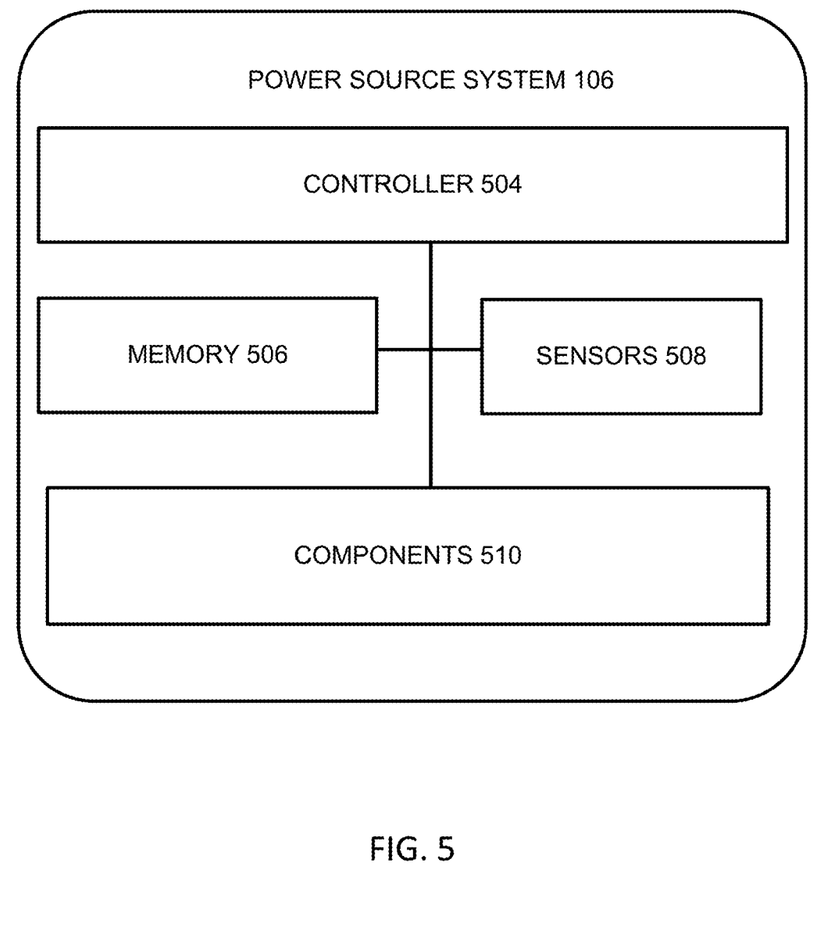
FIG. 5 illustrates an exemplary configuration of a power source system according to the disclosure.

FIG. 5 illustrates an exemplary configuration of a power source system according to the disclosure.

The power source system 106 may include a controller 504. The controller 504 may include a processor and may be implemented as a computer system that may include a memory 506, a display, a transceiver, a user interface, and/or the like. The processor of the controller 504 may be configured to process functions, provide other services, and the like. The computer system may further include a user interface, an input/output device, a computer readable medium, and/or a power supply. Additionally, the computer system may implement an operating system, a touchscreen controller, a communications component, a graphics component, a contact/motion component, and the like to provide full functionality. In particular, the processor of the controller 504 may be configured to execute a software application configured to control the power source system 106. In one aspect, the software application may be configured to interact with sensors, aircraft systems, and the like.

The power source system 106 may further include one or more sensors 508 to sense a condition of the power source system 106, an aircraft system, and/or the like. In particular, the one or more sensors 508 may provide signals to the processor. The one or more sensors 508 may include a current sensor, a voltage sensor, temperature sensor, and/or the like.

The power source system 106 may include components 510. The components 510 may include one or more of a rectifier, a DC to DC converter, a transformer, a voltage regulator, fuses, a ground fault circuit interrupter, temperature sensing circuits, voltage sensing circuits, input devices, output devices, analog-to-digital converters, digital to analog converters, communication devices, and/or the like. The rectifier may be configured to convert alternating current (AC) to direct current (DC) as needed within the power source system 106. The DC to DC converter converts a source of direct current (DC) from one voltage level to another as needed within the power source system 106. The transformer may be configured to step up or step down the alternating current (AC) as needed within the power source system 106. The voltage regulator may be configured to provide a stable DC voltage independent of the load current, temperature, and AC power source variations as needed within the power source system 106. The one or more fuses may be configured to protect against excessive current as needed within the power source system 106. The ground fault circuit interrupter (GFCI) may be configured to break an electric circuit to prevent serious harm from an ongoing electric shock as needed within the power source system 106. In one aspect, the power source system 106 may provide AC power to various locations throughout an aircraft. For example, the power source system 106 may provide AC power to each section of the aircraft, each class of service throughout the aircraft, each section of seats, each row of seats, each seat, and/or the like. In this regard, the power source system 106 may include various branches, distribution portions, and/or the like. Additionally, the power source system 106 may thereafter distribute power to individual ones of the smart universal serial bus (USB-PD (Power Delivery)) outlets 104 at individual seating positions, common positions potentially between two seats, and/or the like. In one aspect, the smart universal serial bus (USB-PD (Power Delivery)) outlets 104, the power source system 106, the central hub 300, and/or the like may first limit power and/or present capacity based on a seat power supply running at max power, and then a secondary limit could be reached to start limiting power if the AC branch current limit was approaching. However, the disclosure includes numerous other configurations, implementations, constructions, and/or the like.

The power source system 106 may be configured to utilize outputs from the temperature or voltage sensing circuits monitored by the controller 504 to safely operate. The power source system 106 may be configured to implement various safety protections. The safety protections implemented by the power source system 106 may include over voltage protection, over current protections, over heat protections, short-circuit protections, and like.

In one aspect, the power source system 106 may operate in response to an aircraft system. The aircraft system may be a central maintenance system (CMS), a flight management system (FMS), a flight warning system (FWS), a cabin management system, or the like.

The power source system 106 and/or the processor may include Built-in test equipment (BITE). The Built-in test equipment (BITE) may be configured to address fault management and include diagnostic equipment built into airborne systems to support maintenance processes. The Built-in test equipment (BITE) may include sensors, multimeters, oscilloscopes, discharge probes, frequency generators, and the like to enable testing and perform diagnostics. The Built-in test equipment (BITE) may include the detection of the fault, the accommodation of the fault (how the system actively responds to the fault), the annunciation or logging of the fault to warn of possible effects and/or aid in troubleshooting the faulty equipment, or the like.

Figure 6:
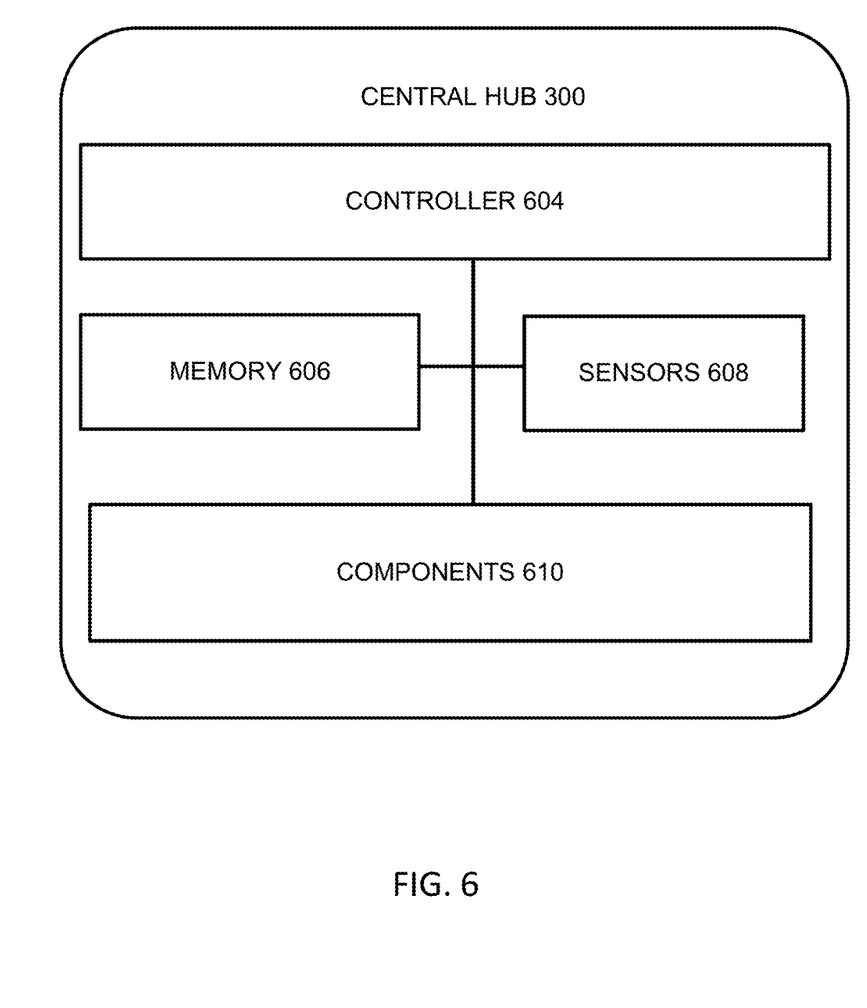
FIG. 6 illustrates an exemplary configuration of a central hub according to the disclosure.

FIG. 6 illustrates an exemplary configuration of a central hub according to the disclosure.

The central hub 300 may include a controller 604. The controller 604 may include a processor and may be implemented as a computer system that may include a memory 606, a display, a transceiver, a user interface, and/or the like. The processor of the controller 604 may be configured to process functions, provide other services, and the like. The computer system may further include a user interface, an input/output device, a computer readable medium, and/or a power supply. Additionally, the computer system may implement components 610 that may include input devices, output devices, analog-to-digital converters, digital to analog converters, communication devices, an operating system, a touchscreen controller, a communications component, a graphics component, a contact/motion component, and the like to provide full functionality. In particular, the processor may be configured to execute a software application configured to control the central hub 300. In one aspect, the software application may be configured to interact with sensors, aircraft systems, and the like.

The central hub 300 may further include one or more sensors 608 to sense a condition of the central hub 300, an aircraft system, or the like. In particular, the one or more sensors 608 may provide signals to the processor. The one or more sensors 608 may include a current sensor, a voltage sensor, temperature sensor, and/or the like.

Figure 7:
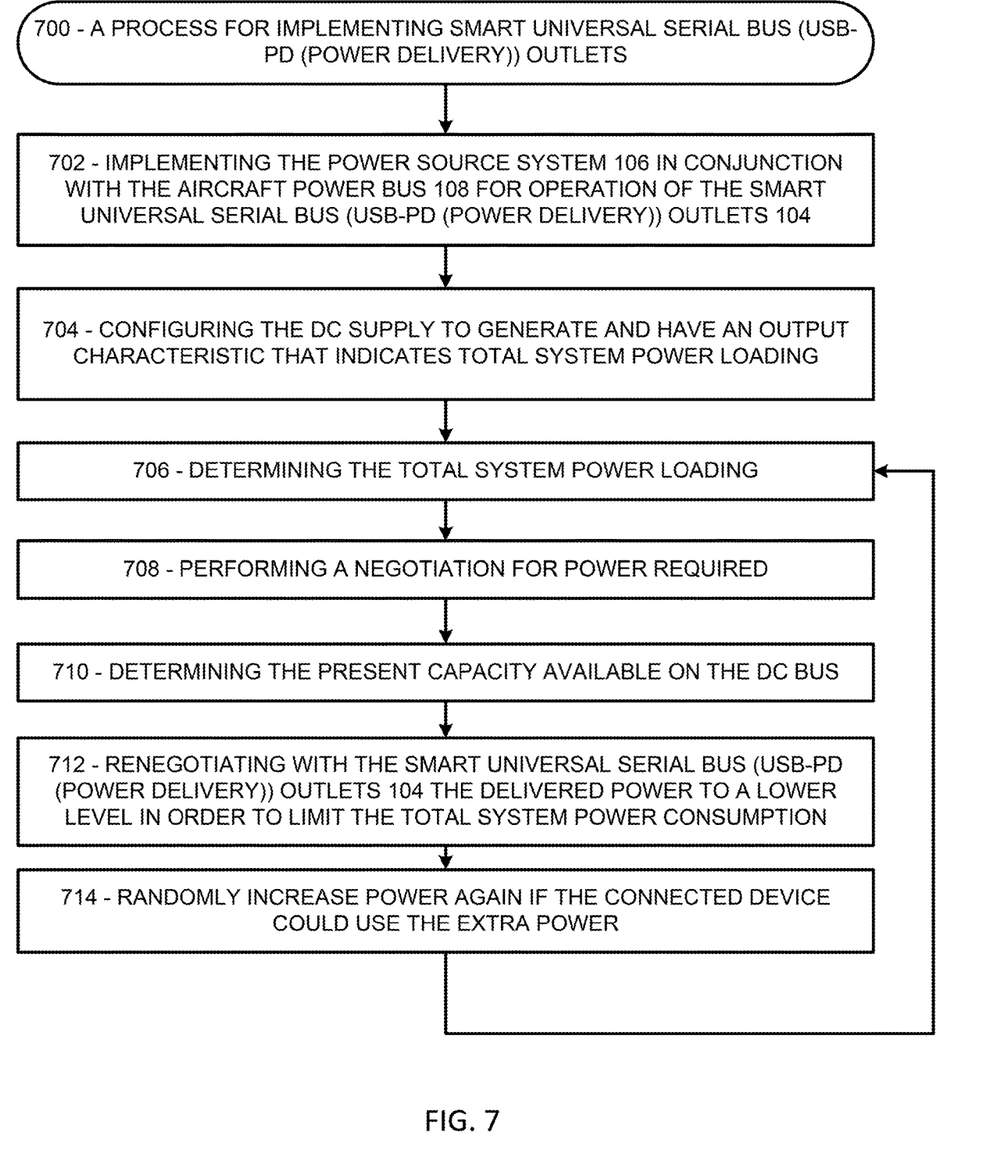
FIG. 7 illustrates a process for implementing smart universal serial bus (USB-PD (Power Delivery)) outlets.

FIG. 7 illustrates a process for implementing smart universal serial bus (USB-PD (Power Delivery)) outlets.

In particular, FIG. 7 illustrates a process for implementing smart universal serial bus (USB-PD (Power Delivery)) outlets (box 700) utilizing the smart universal serial bus (USB-PD (Power Delivery)) outlets 104 as described herein. It should be noted that the aspects of the process for implementing smart universal serial bus (USB-PD (Power Delivery)) outlets (box 700) may be performed in a different order consistent with the aspects described herein. Moreover, the process for implementing smart universal serial bus (USB-PD (Power Delivery)) outlets (box 700) may be modified to have more or fewer processes consistent with the various aspects disclosed herein.

The process for implementing smart universal serial bus (USB-PD (Power Delivery)) outlets (box 700) may include implementing the power source system 106 in conjunction with the aircraft power bus 108 for operation of the smart universal serial bus (USB-PD (Power Delivery)) outlets 104 (box 702) as described herein.

The process for implementing smart universal serial bus (USB-PD (Power Delivery)) outlets (box 700) may include configuring the DC power supply (box 704) to generate and have an output characteristic that indicates total system power loading. For example, an output characteristic that mimics an artificial output impedance of a known value. For instance, the output voltage might drop 100 milli-volts (mV) for every amp of output current, such that an output load of 10 amps (A) would produce a 1 volt (V) drop in output voltage. Alternatively, other signals and other signal over power protocols may be implemented to communicate the total system power loading.

The process for implementing smart universal serial bus (USB-PD (Power Delivery)) outlets (box 700) may include monitoring a bus voltage at the smart universal serial bus (USB-PD (Power Delivery)) outlets 104 and determining the total system power loading (box 706). Alternatively, other signals and other signal over power protocols may be implemented to allow the smart universal serial bus (USB-PD (Power Delivery)) outlets 104 to receive a determination of the total system power loading.

The process for implementing smart universal serial bus (USB-PD (Power Delivery)) outlets (box 700) may include performing a negotiation for power required (box 708) as described herein. The process for implementing smart universal serial bus (USB-PD (Power Delivery)) outlets (box 700) may include sensing with the smart universal serial bus (USB-PD (Power Delivery)) outlets 104 the input bus voltage, and determining the present capacity available on the DC bus (box 710).

The process for implementing smart universal serial bus (USB-PD (Power Delivery)) outlets (box 700) may include renegotiating with the smart universal serial bus (USB-PD (Power Delivery)) outlets 104 the delivered power to a lower level in order to limit the total system power consumption (box 712).

As the smart universal serial bus (USB-PD (Power Delivery)) outlets 104 begin cutting back their power output, the overall system power draw may be reduced until it is at a predetermined level below the maximum. At that point, the smart universal serial bus (USB-PD (Power Delivery)) outlets 104 may randomly increase power again if the connected device could use the extra power (box 714). The result would be that if the system were overloaded by too many high-power loads, all the loads would see random periodic reductions in order to maintain the maximum power below the rated limit.

Accordingly, the disclosure has set forth a system, devices, and/or processes implemented in various means of transport or facilities to improve power delivery to devices for passengers, crew, individuals, and/or the like.

EXAMPLES

Example 1. An aircraft-based power system comprising: at least one smart universal serial bus (USB-PD (Power Delivery)) outlet; the at least one smart universal serial bus (USB-PD (Power Delivery)) outlet being configured to connect to a power bus that receives power from a power source system, the power source system configured to generate an output characteristic indicating a total system power loading; and the at least one smart universal serial bus (USB-PD (Power Delivery)) outlet is further configured to sense the output characteristic, calculate a present capacity available from the power bus, and control power delivery.

Example 2. The aircraft-based power system according to any previous Example wherein the at least one smart universal serial bus (USB-PD (Power Delivery)) outlet is configured to ensure that the aircraft-based power system is never overloaded.

Example 3. The aircraft-based power system according to any previous Example wherein the at least one smart universal serial bus (USB-PD (Power Delivery)) outlet is configured to re-negotiate a delivered power to a lower level in order to limit a total system power consumption as a total bus power approaches 100%.

Example 4. The aircraft-based power system according to any previous Example wherein as the at least one smart universal serial bus (USB-PD (Power Delivery)) outlet begins cutting back power output, an overall system power draw is reduced until it is at a predetermined level below a maximum.

Example 5. The aircraft-based power system according to any previous Example wherein the at least one smart universal serial bus (USB-PD (Power Delivery)) outlet is configured to randomly increase power again if a connected device needs extra power.

Example 6. The aircraft-based power system according to any previous Example wherein the power source system is configured to determine when a power supply temperature has reached a predetermined level and trigger a reduction in a power draw by negotiating a USB power draw lower.

Example 7. The aircraft-based power system according to any previous Example wherein the at least one smart universal serial bus (USB-PD (Power Delivery)) outlet includes a housing assembly implemented as a protective case.

Example 8. The aircraft-based power system according to any previous Example wherein the at least one smart universal serial bus (USB-PD (Power Delivery)) outlet includes a controller.

Example 9. The aircraft-based power system according to any previous Example wherein the power source system includes a controller.

Example 10. The aircraft-based power system according to any previous Example wherein the power bus includes at least two power lines providing positive and negative voltage potential to the at least one smart universal serial bus (USB-PD (Power Delivery)) outlet.

Example 11. An aircraft-based power system comprising: at least one smart universal serial bus (USB-PD (Power Delivery)) outlet; the at least one smart universal serial bus (USB-PD (Power Delivery)) outlet being configured to connect to a power bus that receives power from a power source system; the at least one smart universal serial bus (USB-PD (Power Delivery)) outlet is further configured to receive an indication of total power draw through a DC share bus; and the at least one smart universal serial bus (USB-PD (Power Delivery)) outlet is further configured to receive the indication, calculate a present capacity available from the power bus, and control power delivery.

Example 12. The aircraft-based power system according to any previous Example wherein the DC share bus comprises at least one wire connected to a plurality of smart universal serial bus (USB-PD (Power Delivery)) outlets.

Example 13. The aircraft-based power system according to any previous Example wherein the at least one smart universal serial bus (USB-PD (Power Delivery)) outlet is configured to ensure that the aircraft-based power system is never overloaded.

Example 14. The aircraft-based power system according to any previous Example wherein the at least one smart universal serial bus (USB-PD (Power Delivery)) outlet is configured to re-negotiate a delivered power to a lower level in order to limit a total system power consumption as a total bus power approaches 100%.

Example 15. The aircraft-based power system according to any previous Example wherein as the at least one smart universal serial bus (USB-PD (Power Delivery)) outlet begins cutting back power output, an overall system power draw is reduced until it is at a predetermined level below a maximum.

Example 16. The aircraft-based power system according to any previous Example wherein the at least one smart universal serial bus (USB-PD (Power Delivery)) outlet is configured to randomly increase power again if a connected device needs extra power.

Example 17. The aircraft-based power system according to any previous Example wherein the power source system is configured to determine when a power supply temperature has reached a predetermined level and trigger a reduction in a power draw by negotiating a USB power draw lower.

Example 18. The aircraft-based power system according to any previous Example wherein the at least one smart universal serial bus (USB-PD (Power Delivery)) outlet includes a housing assembly implemented as a protective case.

Example 19. The aircraft-based power system according to any previous Example wherein the at least one smart universal serial bus (USB-PD (Power Delivery)) outlet includes a controller.

Example 20. The aircraft-based power system according to any previous Example wherein the power source system includes a controller.

Example 21. The aircraft-based power system according to any previous Example wherein the power bus includes at least two power lines providing positive and negative voltage potential to the at least one smart universal serial bus (USB-PD (Power Delivery)) outlet.

Example 22. An aircraft-based power system comprising: at least one smart universal serial bus (USB-PD (Power Delivery)) outlet; the at least one smart universal serial bus (USB-PD (Power Delivery)) outlet being configured to connect to a power bus that receives power from a power source system; the at least one smart universal serial bus (USB-PD (Power Delivery)) outlet further configured to digitize a power used and communicate the power used to a central hub, wherein the central hub is configured to monitor power levels and command power reduction via USB renegotiation when a total power limit was reached; and the at least one smart universal serial bus (USB-PD (Power Delivery)) outlet configured to receive the command and control power delivery.

Example 23. The aircraft-based power system according to any previous Example wherein the at least one smart universal serial bus (USB-PD (Power Delivery)) outlet is configured to ensure that the aircraft-based power system is never overloaded.

Example 24. The aircraft-based power system according to any previous Example wherein the at least one smart universal serial bus (USB-PD (Power Delivery)) outlet is configured to re-negotiate a delivered power to a lower level in order to limit a total system power consumption as a total bus power approaches 100%.

Example 25. The aircraft-based power system according to any previous Example wherein as the at least one smart universal serial bus (USB-PD (Power Delivery)) outlet begins cutting back power output, an overall system power draw is reduced until it is at a predetermined level below a maximum.

Example 26. The aircraft-based power system according to any previous Example wherein the at least one smart universal serial bus (USB-PD (Power Delivery)) outlet is configured to randomly increase power again if a connected device needs extra power.

Example 27. The aircraft-based power system according to any previous Example wherein the power source system is configured to determine when a power supply temperature has reached a predetermined level and trigger a reduction in a power draw by negotiating a USB power draw lower.

Example 28. The aircraft-based power system according to any previous Example wherein the at least one smart universal serial bus (USB-PD (Power Delivery)) outlet includes a housing assembly implemented as a protective case.

Example 29. The aircraft-based power system according to any previous Example wherein the at least one smart universal serial bus (USB-PD (Power Delivery)) outlet includes a controller.

Example 30. The aircraft-based power system according to any previous Example wherein the power source system includes a controller.

Example 31. The aircraft-based power system according to any previous Example wherein the power bus includes at least two power lines providing positive and negative voltage potential to the at least one smart universal serial bus (USB-PD (Power Delivery)) outlet.

Example 32. A power system comprising: at least one smart universal serial bus (USB-PD (Power Delivery)) outlet; the at least one smart universal serial bus (USB-PD (Power Delivery)) outlet being configured to connect to a power bus that receives power from a power source system, the power source system configured to generate an output characteristic indicating a total system power loading; and the at least one smart universal serial bus (USB-PD (Power Delivery)) outlet is further configured to sense the output characteristic, calculate a present capacity available from the power bus, and control power delivery.

Example 33. The power system according to any previous Example wherein the at least one smart universal serial bus (USB-PD (Power Delivery)) outlet is configured to ensure that the power system is never overloaded.

Example 34. The power system according to any previous Example wherein the at least one smart universal serial bus (USB-PD (Power Delivery)) outlet is configured to re-negotiate a delivered power to a lower level in order to limit a total system power consumption as a total bus power approaches 100%.

Example 35. The power system according to any previous Example wherein as the at least one smart universal serial bus (USB-PD (Power Delivery)) outlet begins cutting back power output, an overall system power draw is reduced until it is at a predetermined level below a maximum.

Example 36. The power system according to any previous Example wherein the at least one smart universal serial bus (USB-PD (Power Delivery)) outlet is configured to randomly increase power again if a connected device needs extra power.

Example 37. The power system according to any previous Example wherein the power source system is configured to determine when a power supply temperature has reached a predetermined level and trigger a reduction in a power draw by negotiating a USB power draw lower.

Example 38. The power system according to any previous Example wherein the at least one smart universal serial bus (USB-PD (Power Delivery)) outlet includes a housing assembly implemented as a protective case.

Example 39. The power system according to any previous Example wherein the at least one smart universal serial bus (USB-PD (Power Delivery)) outlet includes a controller.

Example 40. The power system according to any previous Example wherein the power source system includes a controller.

Example 41. The power system according to any previous Example wherein the power bus includes at least two power lines providing positive and negative voltage potential to the at least one smart universal serial bus (USB-PD (Power Delivery)) outlet.

As described herein, Universal Serial Bus (USB-PD (Power Delivery)) is an industry standard that establishes specifications for cables and connectors and protocols for connection, communication and power supply between computers, peripheral devices and other computers. The Universal Serial Bus (USB-PD (Power Delivery)) may utilize various specifications including USB 1.x, USB 2.0, USB 3.x, USB4, and the like.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The many features and advantages of the disclosure are apparent from the detailed specification, and, thus, it is intended by the appended claims to cover all such features and advantages of the disclosure, which fall within the true spirit, and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. An aircraft-based power system comprising:
at least one smart universal serial bus power delivery (USB-PD) outlet;
the at least one smart universal serial bus power delivery (USB-PD) outlet being configured to connect to power lines of a power bus to provide power to a user device and the power bus receives power from a power source system;
the power source system is configured to generate an output characteristic on at least one of the power lines of the power bus indicating a total system power loading; and
the at least one smart universal serial bus power delivery (USB-PD) outlet is further configured to sense the output characteristic on the at least one of the power lines of the power bus from the power source system, calculate a present capacity available from the power bus based on the output characteristic on the power bus from the power source system, and negotiate a level of power delivery to the user device based on the output characteristic on the power bus from the power source system and/or the present capacity available from the power bus.

2. The aircraft-based power system according to claim 1 wherein the at least one smart universal serial bus power delivery (USB-PD) outlet is further configured to negotiate a lower power step by step to control the level of power delivery to the user device; and
wherein the at least one smart universal serial bus power delivery (USB-PD) outlet is configured to ensure that the aircraft-based power system is never overloaded.

3. The aircraft-based power system according to claim 1 wherein the output characteristic on the power bus indicating the total system power loading comprises an output voltage of the power source system; and
wherein the at least one smart universal serial bus power delivery (USB-PD) outlet is configured to re-negotiate a delivered power to a lower level in order to limit a total system power consumption as a total bus power increases to 100%.

4. The aircraft-based power system according to claim 1 wherein as the at least one smart universal serial bus power delivery (USB-PD) outlet begins cutting back power output, an overall system power draw is reduced until it is at a predetermined level below a maximum.

5. The aircraft-based power system according to claim 1
wherein the output characteristic on the power bus indicating the total system power loading comprises an output voltage of the power source system; and
wherein the at least one smart universal serial bus power delivery (USB-PD) outlet is configured to randomly increase power again if a connected device needs extra power.

6. The aircraft-based power system according to claim 1 wherein the power source system is configured to determine when a power supply temperature has reached a predetermined level and trigger a reduction in a power draw by negotiating a USB power draw lower.

7. The aircraft-based power system according to claim 1
wherein the at least one smart universal serial bus power delivery (USB-PD) outlet is further configured to negotiate the level of power delivery to the user device based on a randomized level of capacity available from the power bus; and
wherein the at least one smart universal serial bus power delivery (USB-PD) outlet includes a housing assembly implemented as a protective case.

8. The aircraft-based power system according to claim 1
wherein the output characteristic on the power bus indicating the total system power loading comprises an output voltage of the power source system; and
wherein the at least one smart universal serial bus power delivery (USB-PD) outlet includes a controller.

9. The aircraft-based power system according to claim 1
wherein the output characteristic on the power bus indicating the total system power loading comprises an output voltage of the power source system; and
wherein the power source system includes a controller configured to execute a software application configured to control the power source system.

10. The aircraft-based power system according to claim 1 wherein the power lines provide positive and negative voltage power to the at least one smart universal serial bus power delivery (USB-PD) outlet.

11. An aircraft-based power system comprising:
at least one smart universal serial bus power delivery (USB-PD) outlet;
the at least one smart universal serial bus power delivery (USB-PD) outlet being configured to connect to power lines of a power bus to provide power to a user device and the power bus receives power from a power source system;
the at least one smart universal serial bus power delivery (USB-PD) outlet is further configured to receive an indication of total power draw through at least one of the power lines of the power bus; and
the at least one smart universal serial bus power delivery (USB-PD) outlet is further configured to receive the indication on the at least one of the power lines of the power bus from the power source system, calculate a present capacity available from the power bus based on the indication on the power bus from the power source system, and negotiate a level of power delivery to a user device based on the indication on the power bus from the power source system and/or the present capacity available from the power bus.

12. The aircraft-based power system according to claim 11
wherein the at least one smart universal serial bus power delivery (USB-PD) outlet is further configured to negotiate a lower power step by step to control the level of power delivery to the user device; and
wherein the at least one smart universal serial bus power delivery (USB-PD) outlet is configured to ensure that the aircraft-based power system is never overloaded.

13. The aircraft-based power system according to claim 11
wherein the indication on the power bus indicating a total system power loading comprises an output voltage of the power source system; and
wherein the at least one smart universal serial bus power delivery (USB-PD) outlet is configured to ensure that the aircraft-based power system is never overloaded.

14. The aircraft-based power system according to claim 11
wherein the at least one smart universal serial bus power delivery (USB-PD) outlet is configured to re-negotiate a delivered power to a lower level in order to limit a total system power consumption as a total bus power increases to 100%.

15. The aircraft-based power system according to claim 11
wherein the indication on the power bus indicating a total system power loading comprises an output voltage of the power source system; and
wherein as the at least one smart universal serial bus power delivery (USB-PD) outlet begins cutting back power output, an overall system power draw is reduced until it is at a predetermined level below a maximum.

16. The aircraft-based power system according to claim 11 wherein the at least one smart universal serial bus power delivery (USB-PD) outlet is configured to randomly increase power again if a connected device needs extra power.

17. The aircraft-based power system according to claim 11 wherein the power source system is configured to determine when a power supply temperature has reached a predetermined level and trigger a reduction in a power draw by negotiating a USB power draw lower.

18. The aircraft-based power system according to claim 11
wherein the at least one smart universal serial bus power delivery (USB-PD) outlet is further configured to negotiate the level of power delivery to the user device based on a randomized level of capacity available from the power bus; and
wherein the at least one smart universal serial bus power delivery (USB-PD) outlet includes a housing assembly implemented as a protective case.

19. The aircraft-based power system according to claim 11
wherein the indication on the power bus indicating a total system power loading comprises an output voltage of the power source system; and
wherein the at least one smart universal serial bus power delivery (USB-PD) outlet includes a controller.

20. The aircraft-based power system according to claim 11 wherein the power source system includes a controller configured to execute a software application configured to control the power source system.

* * * * *